US011400519B2

(12) United States Patent
Karlsson (10) Patent No.: US 11,400,519 B2
(45) Date of Patent: Aug. 2, 2022

(54) METHOD AND DEVICE FOR DISTRIBUTING POWDER MATERIAL

(71) Applicant: Arcam AB, Moelndal (SE)

(72) Inventor: Kristofer Karlsson, Kungsbacka (SE)

(73) Assignee: Arcam AB, Moelndal (SE)

( * ) Notice: Subject to any disclaimer, the term of this patent is extended or adjusted under 35 U.S.C. 154(b) by 0 days.

(21) Appl. No.: 16/266,729

(22) Filed: Feb. 4, 2019

(65) Prior Publication Data

US 2019/0299287 A1    Oct. 3, 2019

Related U.S. Application Data

(60) Provisional application No. 62/649,750, filed on Mar. 29, 2018.

(51) Int. Cl.
*B33Y 10/00* (2015.01)
*B22F 10/10* (2021.01)
(Continued)

(52) U.S. Cl.
CPC .............. *B22F 12/00* (2021.01); *B22F 1/052* (2022.01); *B22F 10/10* (2021.01); *B33Y 10/00* (2014.12);
(Continued)

(58) Field of Classification Search
CPC ................. B22F 3/1055; B22F 1/0014; B22F 2003/1056; B22F 2003/1057; B33Y 10/00;
(Continued)

(56) References Cited

U.S. PATENT DOCUMENTS 2,264,968 A   12/1941  De Forest
2,323,715 A    7/1943  Kuehni
(Continued)

FOREIGN PATENT DOCUMENTS

CA        2860188 A1    6/2006
CN     101607311 A     12/2009
(Continued)

OTHER PUBLICATIONS

International Search Report and Written Opinion dated May 17, 2019 for PCT/EP2019/054907 (11 pages).
(Continued)

*Primary Examiner* — Rebecca Janssen
(74) *Attorney, Agent, or Firm* — Dinsmore & Shohl LLP (57) ABSTRACT

Described is an additive manufacturing apparatus for additive manufacturing of three dimensional objects, said apparatus comprises a powder distribution unit movable across a build area for applying a layer of powder material thereon and a solidification device for selectively solidifying the applied powder layer at positions corresponding to a cross section of the object to be manufactured. Said powder distribution unit comprises at least a first and a second powder distributors essentially in parallel with each other and extending in a first direction, said first and second powder distributors are arranged to be adjustably spaced apart in a second direction transversely to said first direction which second direction is essentially in parallel with the direction of movement of said powder distribution unit over said build area.

13 Claims, 5 Drawing Sheets

(51) Int. Cl.
  *B22F 12/00* (2021.01)
  *B22F 1/052* (2022.01)
  *B33Y 30/00* (2015.01)
  *B33Y 40/00* (2020.01)
  *B33Y 50/02* (2015.01)

(52) U.S. Cl.
  CPC .............. *B33Y 30/00* (2014.12); *B33Y 40/00* (2014.12); *B33Y 50/02* (2014.12)

(58) Field of Classification Search
  CPC ......... B33Y 30/00; B33Y 40/00; B33Y 50/02; Y02P 10/25
  See application file for complete search history.

(56) References Cited

U.S. PATENT DOCUMENTS

| | | |
|---|---|---|
| 3,634,644 A | 1/1972 | Ogden et al. |
| 3,838,496 A | 10/1974 | Kelly |
| 3,882,477 A | 5/1975 | Mueller |
| 3,906,229 A | 9/1975 | Demeester et al. |
| 3,908,124 A | 9/1975 | Rose |
| 4,314,134 A | 2/1982 | Schumacher et al. |
| 4,348,576 A | 9/1982 | Anderl et al. |
| 4,352,565 A | 10/1982 | Rowe et al. |
| 4,401,719 A | 8/1983 | Kobayashi et al. |
| 4,541,055 A | 9/1985 | Wolfe et al. |
| 4,651,002 A | 3/1987 | Anno |
| 4,818,562 A | 4/1989 | Arcella et al. |
| 4,863,538 A | 9/1989 | Deckard |
| 4,888,490 A | 12/1989 | Bass et al. |
| 4,927,992 A | 5/1990 | Whitlow et al. |
| 4,958,431 A | 9/1990 | Clark et al. |
| 4,988,844 A | 1/1991 | Dietrich et al. |
| 5,118,192 A | 6/1992 | Chen et al. |
| 5,135,695 A | 8/1992 | Marcus |
| 5,167,989 A | 12/1992 | Dudek et al. |
| 5,182,170 A | 1/1993 | Marcus et al. |
| 5,204,055 A | 4/1993 | Sachs et al. |
| 5,247,560 A | 9/1993 | Hosokawa et al. |
| 5,393,482 A | 2/1995 | Benda et al. |
| 5,483,036 A | 1/1996 | Giedt et al. |
| 5,508,489 A | 4/1996 | Benda et al. |
| 5,511,103 A | 4/1996 | Hasegawa |
| 5,595,670 A | 1/1997 | Mombo Caristan |
| 5,647,931 A | 7/1997 | Retallick et al. |
| 5,753,274 A | 5/1998 | Wilkening et al. |
| 5,837,960 A | 11/1998 | Lewis et al. |
| 5,876,550 A | 3/1999 | Feygin et al. |
| 5,904,890 A | 5/1999 | Lohner et al. |
| 5,932,290 A | 8/1999 | Lombardi et al. |
| 6,046,426 A | 4/2000 | Jeantette et al. |
| 6,162,378 A | 12/2000 | Bedal et al. |
| 6,204,469 B1 | 3/2001 | Fields et al. |
| 6,419,203 B1 | 7/2002 | Dang |
| 6,537,052 B1 | 3/2003 | Adler |
| 6,554,600 B1 | 4/2003 | Hofmann et al. |
| 6,583,379 B1 | 6/2003 | Meiners et al. |
| 6,676,892 B2 | 1/2004 | Das et al. |
| 6,724,001 B1 | 4/2004 | Pinckney et al. |
| 6,746,506 B2 | 6/2004 | Liu et al. |
| 6,751,516 B1 | 6/2004 | Richardson |
| 6,764,636 B1 | 7/2004 | Allanic et al. |
| 6,811,744 B2 | 11/2004 | Keicher et al. |
| 6,815,636 B2 | 11/2004 | Chung et al. |
| 6,824,714 B1 | 11/2004 | Türck et al. |
| 7,003,864 B2 | 2/2006 | Dirscherl |
| 7,020,539 B1 | 3/2006 | Kovacevic et al. |
| 7,165,498 B2 | 1/2007 | Mackrill et al. |
| 7,204,684 B2 | 4/2007 | Ederer et al. |
| 7,291,002 B2 | 11/2007 | Russell et al. |
| 7,452,500 B2 | 11/2008 | Uckelmann |
| 7,454,262 B2 | 11/2008 | Larsson et al. |
| 7,537,722 B2 | 5/2009 | Andersson et al. |
| 7,540,738 B2 | 6/2009 | Larsson et al. |
| 7,569,174 B2 | 8/2009 | Ruatta et al. |
| 7,635,825 B2 | 12/2009 | Larsson |
| 7,686,605 B2 | 3/2010 | Perret et al. |
| 7,696,501 B2 | 4/2010 | Jones |
| 7,713,454 B2 | 5/2010 | Larsson |
| 7,754,135 B2 | 7/2010 | Abe et al. |
| 7,799,253 B2 | 9/2010 | Höchsmann et al. |
| 7,871,551 B2 | 1/2011 | Wallgren et al. |
| 8,021,138 B2 | 9/2011 | Green |
| 8,083,513 B2 | 12/2011 | Montero-Escuder et al. |
| 8,137,739 B2 | 3/2012 | Philippi et al. |
| 8,187,521 B2 | 5/2012 | Larsson et al. |
| 8,308,466 B2 | 11/2012 | Ackelid et al. |
| 8,992,816 B2 | 3/2015 | Jonasson et al. |
| 9,073,265 B2 | 7/2015 | Snis |
| 9,079,248 B2 | 7/2015 | Ackelid |
| 9,126,167 B2 | 9/2015 | Ljungblad |
| 9,254,535 B2 | 2/2016 | Buller et al. |
| 9,310,188 B2 | 4/2016 | Snis |
| 9,505,172 B2 | 11/2016 | Ljungblad |
| 9,550,207 B2 | 1/2017 | Ackelid |
| 9,802,253 B2 | 10/2017 | Jonasson |
| 9,950,367 B2 | 4/2018 | Backlund et al. |
| 10,071,422 B2 | 9/2018 | Buller et al. |
| 2002/0104973 A1 | 8/2002 | Kerekes |
| 2002/0152002 A1 | 10/2002 | Lindemann et al. |
| 2002/0195747 A1 | 12/2002 | Hull et al. |
| 2003/0043360 A1 | 3/2003 | Farnworth |
| 2003/0133822 A1 | 7/2003 | Harryson |
| 2003/0205851 A1 | 11/2003 | Laschutza et al. |
| 2004/0012124 A1 | 1/2004 | Li et al. |
| 2004/0026807 A1 | 2/2004 | Andersson et al. |
| 2004/0084814 A1 | 5/2004 | Boyd et al. |
| 2004/0104499 A1 | 6/2004 | Keller |
| 2004/0148048 A1 | 7/2004 | Farnworth |
| 2004/0173496 A1 | 9/2004 | Srinivasan |
| 2004/0173946 A1 | 9/2004 | Pfeifer et al. |
| 2004/0204765 A1 | 10/2004 | Fenning et al. |
| 2004/0217095 A1 | 11/2004 | Herzog |
| 2005/0173380 A1 | 8/2005 | Carbone |
| 2005/0186538 A1 | 8/2005 | Uckelmann |
| 2005/0282300 A1 | 12/2005 | Yun et al. |
| 2006/0108712 A1 | 5/2006 | Mattes |
| 2006/0138325 A1 | 6/2006 | Choi |
| 2006/0145381 A1 | 7/2006 | Larsson |
| 2006/0147332 A1 | 7/2006 | Jones et al. |
| 2006/0157892 A1 | 7/2006 | Larsson |
| 2006/0180957 A1 | 8/2006 | Hopkinson et al. |
| 2006/0284088 A1 | 12/2006 | Fukunaga et al. |
| 2007/0074659 A1 | 4/2007 | Wahlstrom |
| 2007/0175875 A1 | 8/2007 | Uckelmann et al. |
| 2007/0179655 A1 | 8/2007 | Farnworth |
| 2007/0182289 A1 | 8/2007 | Kigawa et al. |
| 2007/0298182 A1 | 12/2007 | Perret et al. |
| 2008/0236738 A1 | 10/2008 | Lo et al. |
| 2009/0017219 A1 | 1/2009 | Paasche et al. |
| 2009/0152771 A1 | 6/2009 | Philippi et al. |
| 2009/0206056 A1 | 8/2009 | Xu et al. |
| 2010/0007062 A1 | 1/2010 | Larsson et al. |
| 2010/0260410 A1 | 10/2010 | Taminger et al. |
| 2010/0305743 A1 | 12/2010 | Larsson |
| 2010/0310404 A1 | 12/2010 | Ackelid |
| 2010/0316856 A1 | 12/2010 | Currie et al. |
| 2011/0061591 A1 | 3/2011 | Stecker |
| 2011/0114839 A1 | 5/2011 | Stecker et al. |
| 2011/0133367 A1 | 6/2011 | Weidinger et al. |
| 2011/0240607 A1 | 10/2011 | Stecker et al. |
| 2011/0241575 A1 | 10/2011 | Caiafa et al. |
| 2011/0293770 A1 | 12/2011 | Ackelid et al. |
| 2011/0293771 A1 | 12/2011 | Oberhofer et al. |
| 2011/0309554 A1 | 12/2011 | Liska et al. |
| 2011/0316178 A1 | 12/2011 | Uckelmann |
| 2012/0100031 A1 | 4/2012 | Ljungblad |
| 2012/0164322 A1 | 6/2012 | Teulet et al. |
| 2012/0183701 A1 | 7/2012 | Pilz et al. |
| 2012/0193530 A1 | 8/2012 | Parker et al. |
| 2012/0211155 A1 | 8/2012 | Wehning et al. |
| 2012/0223059 A1 | 9/2012 | Ackelid |
| 2012/0225210 A1 | 9/2012 | Fruth |

(56) References Cited

U.S. PATENT DOCUMENTS

| | | |
|---|---|---|
| 2012/0237745 A1 | 9/2012 | Dierkes et al. |
| 2012/0266815 A1 | 10/2012 | Brunermer |
| 2013/0055568 A1 | 3/2013 | Dusel et al. |
| 2013/0162134 A1 | 6/2013 | Mattausch et al. |
| 2013/0186514 A1 | 7/2013 | Zhuang et al. |
| 2013/0216959 A1 | 8/2013 | Tanaka et al. |
| 2013/0233846 A1 | 9/2013 | Jakimov et al. |
| 2013/0264750 A1 | 10/2013 | Hofacker et al. |
| 2013/0270750 A1 | 10/2013 | Green |
| 2013/0278920 A1 | 10/2013 | Loewgren |
| 2013/0300286 A1 | 11/2013 | Ljungblad et al. |
| 2013/0343947 A1 | 12/2013 | Satzger et al. |
| 2014/0175708 A1 | 6/2014 | Echigo et al. |
| 2014/0271964 A1 | 9/2014 | Roberts, IV et al. |
| 2014/0301884 A1 | 10/2014 | Hellestam et al. |
| 2014/0308153 A1 | 10/2014 | Ljungblad |
| 2014/0314609 A1 | 10/2014 | Ljungblad et al. |
| 2014/0314964 A1 | 10/2014 | Ackelid |
| 2014/0348691 A1 | 11/2014 | Ljungblad et al. |
| 2014/0363327 A1 | 12/2014 | Holcomb |
| 2014/0367367 A1 | 12/2014 | Wood et al. |
| 2015/0004045 A1 | 1/2015 | Ljungblad |
| 2015/0050463 A1 | 2/2015 | Nakano et al. |
| 2015/0071809 A1* | 3/2015 | Nordkvist ............... B22F 3/008 419/23 |
| 2015/0086409 A1 | 3/2015 | Hellestam |
| 2015/0088295 A1 | 3/2015 | Hellestam |
| 2015/0130118 A1 | 5/2015 | Cheng et al. |
| 2015/0139849 A1 | 5/2015 | Pialot, Jr. et al. |
| 2015/0151490 A1 | 6/2015 | Jonasson et al. |
| 2015/0165524 A1 | 6/2015 | Ljungblad et al. |
| 2015/0165525 A1 | 6/2015 | Jonasson |
| 2015/0174658 A1 | 6/2015 | Ljungblad |
| 2015/0174695 A1 | 6/2015 | Elfstroem et al. |
| 2015/0251249 A1 | 9/2015 | Fager |
| 2015/0273622 A1 | 10/2015 | Manabe |
| 2015/0283610 A1 | 10/2015 | Ljungblad et al. |
| 2015/0283613 A1 | 10/2015 | Backlund et al. |
| 2015/0290710 A1 | 10/2015 | Ackelid |
| 2015/0306819 A1 | 10/2015 | Ljungblad |
| 2016/0052056 A1 | 2/2016 | Fager |
| 2016/0052079 A1 | 2/2016 | Ackelid |
| 2016/0054115 A1 | 2/2016 | Snis |
| 2016/0054121 A1 | 2/2016 | Snis |
| 2016/0054347 A1 | 2/2016 | Snis |
| 2016/0059314 A1 | 3/2016 | Ljungblad et al. |
| 2016/0129501 A1 | 5/2016 | Loewgren et al. |
| 2016/0167160 A1 | 6/2016 | Hellestam |
| 2016/0167303 A1 | 6/2016 | Petelet |
| 2016/0202042 A1 | 7/2016 | Snis |
| 2016/0202043 A1 | 7/2016 | Snis |
| 2016/0211116 A1 | 7/2016 | Lock |
| 2016/0236279 A1 | 8/2016 | Ashton et al. |
| 2016/0279735 A1 | 9/2016 | Hellestam |
| 2016/0282848 A1 | 9/2016 | Hellestam |
| 2016/0303687 A1 | 10/2016 | Ljungblad |
| 2016/0307731 A1 | 10/2016 | Lock |
| 2016/0311021 A1 | 10/2016 | Elfstroem et al. |
| 2016/0368054 A1 | 12/2016 | Ng et al. |
| 2017/0080494 A1 | 3/2017 | Ackelid |
| 2017/0087661 A1 | 3/2017 | Backlund et al. |
| 2017/0106443 A1 | 4/2017 | Karlsson |
| 2017/0106570 A1 | 4/2017 | Karlsson |
| 2017/0136541 A1 | 5/2017 | Fager |
| 2017/0136542 A1 | 5/2017 | Nordkvist et al. |
| 2017/0173691 A1 | 6/2017 | Jonasson |
| 2017/0189964 A1 | 7/2017 | Backlund et al. |
| 2017/0227417 A1 | 8/2017 | Snis |
| 2017/0227418 A1 | 8/2017 | Snis |
| 2017/0246684 A1 | 8/2017 | Hellestam |
| 2017/0246685 A1 | 8/2017 | Hellestam |
| 2017/0259338 A1 | 9/2017 | Ackelid |
| 2017/0282248 A1 | 10/2017 | Ljungblad et al. |
| 2017/0294288 A1 | 10/2017 | Lock |
| 2017/0341141 A1 | 11/2017 | Ackelid |
| 2017/0341142 A1 | 11/2017 | Ackelid |
| 2017/0348791 A1 | 12/2017 | Ekberg |
| 2017/0348792 A1 | 12/2017 | Fager |
| 2018/0009033 A1 | 1/2018 | Fager |
| 2018/0154444 A1 | 6/2018 | Jonasson |
| 2020/0346408 A1* | 11/2020 | Rode .................... B29C 64/329 |

FOREIGN PATENT DOCUMENTS

| | | | |
|---|---|---|---|
| CN | 101635210 A | 1/2010 | |
| CN | 201693176 U | 1/2011 | |
| CN | 101607311 B | 9/2011 | |
| CN | 203509463 U | 4/2014 | |
| DE | 19952998 A1 | 5/2001 | |
| DE | 20305843 U1 | 7/2003 | |
| DE | 10235434 A1 | 2/2004 | |
| DE | 102005014483 A1 | 10/2006 | |
| DE | 202008005417 U1 | 8/2008 | |
| DE | 102007018601 A1 | 10/2008 | |
| DE | 102007029052 A1 | 1/2009 | |
| DE | 102007040755 A1 * | 3/2009 | ........... B23K 26/127 |
| DE | 102007040755 A1 | 3/2009 | |
| DE | 102008012064 A1 | 9/2009 | |
| DE | 102010041284 A1 | 3/2012 | |
| DE | 102011105045 B3 | 6/2012 | |
| DE | 102013210242 A1 | 12/2014 | |
| EP | 0289116 A1 | 11/1988 | |
| EP | 0322257 A2 | 6/1989 | |
| EP | 0688262 A1 | 12/1995 | |
| EP | 1358994 A1 | 11/2003 | |
| EP | 1418013 A1 | 5/2004 | |
| EP | 1466718 A2 | 10/2004 | |
| EP | 1486318 A2 | 12/2004 | |
| EP | 1669143 A1 | 6/2006 | |
| EP | 1683593 A2 | 7/2006 | |
| EP | 1721725 A1 | 11/2006 | |
| EP | 1752240 A1 | 2/2007 | |
| EP | 1952932 A2 | 8/2008 | |
| EP | 2011631 A1 | 1/2009 | |
| EP | 2119530 A1 | 11/2009 | |
| EP | 2281677 A1 | 2/2011 | |
| EP | 2289652 A1 | 3/2011 | |
| EP | 2292357 A1 | 3/2011 | |
| EP | 2832474 A1 | 2/2015 | |
| FR | 2980380 A1 | 3/2013 | |
| JP | H05-171423 A | 7/1993 | |
| JP | 2003241394 A | 8/2003 | |
| JP | 2003245981 | 9/2003 | |
| JP | 2009006509 A | 1/2009 | |
| JP | 2017007221 A | 1/2017 | |
| JP | 2017159530 A | 9/2017 | |
| SE | 524467 C2 | 8/2004 | |
| WO | WO 1993/08928 A1 | 5/1993 | |
| WO | WO 1996/012607 A1 | 5/1996 | |
| WO | WO 1997/37523 A2 | 10/1997 | |
| WO | WO 2001/081031 A1 | 11/2001 | |
| WO | WO 2001/85386 A2 | 11/2001 | |
| WO | WO 2002/008653 A1 | 1/2002 | |
| WO | WO 2004/007124 A1 | 1/2004 | |
| WO | WO 2004/043680 A2 | 5/2004 | |
| WO | WO 2004/054743 A1 | 7/2004 | |
| WO | WO 2004/056511 A1 | 7/2004 | |
| WO | WO 2004/106041 A2 | 12/2004 | |
| WO | WO 2004/108398 A1 | 12/2004 | |
| WO | WO 2006/091097 A2 | 8/2006 | |
| WO | WO 2006/121374 A1 | 11/2006 | |
| WO | WO 2007/112808 A1 | 10/2007 | |
| WO | WO 2007/147221 A1 | 12/2007 | |
| WO | WO 2008/013483 A1 | 1/2008 | |
| WO | WO 2008/057844 A1 | 5/2008 | |
| WO | WO 2008/074287 A1 | 6/2008 | |
| WO | WO 2008/125497 A1 | 10/2008 | |
| WO | WO 2008/147306 A1 | 12/2008 | |
| WO | WO 2009/000360 A1 | 12/2008 | |
| WO | WO 2009/072935 A1 | 6/2009 | |
| WO | WO 2009/084991 A1 | 7/2009 | |
| WO | WO 2010/095987 A1 | 8/2010 | |
| WO | WO 2010/125371 A1 | 11/2010 | |
| WO | WO 2011/008143 A1 | 1/2011 | |

(56) References Cited

FOREIGN PATENT DOCUMENTS

| WO | WO 2011/011818 A1 | 2/2011 | |
|---|---|---|---|
| WO | WO 2011/030017 A1 | 3/2011 | |
| WO | WO 2011/060312 A2 | 5/2011 | |
| WO | WO 2012/102655 A1 | 8/2012 | |
| WO | WO 2013/092997 A1 | 6/2013 | |
| WO | WO 2013/098050 A1 | 7/2013 | |
| WO | WO 2013/098135 A1 | 7/2013 | |
| WO | 2013117185 A1 | 8/2013 | |
| WO | WO-2013117185 A1 * | 8/2013 | ............ B33Y 30/00 |
| WO | WO 2013/159811 A1 | 10/2013 | |
| WO | WO 2013/167194 A1 | 11/2013 | |
| WO | WO 2013/178825 A2 | 12/2013 | |
| WO | WO 2014/071968 A1 | 5/2014 | |
| WO | WO 2014/092651 A1 | 6/2014 | |
| WO | WO 2014/095200 A1 | 6/2014 | |
| WO | WO 2014/095208 A1 | 6/2014 | |
| WO | WO 2014/195068 A1 | 12/2014 | |
| WO | WO 2015/032590 A2 | 3/2015 | |
| WO | WO 2015/091813 A1 | 6/2015 | |
| WO | WO 2015/120168 A1 | 8/2015 | |
| WO | WO 2015/142492 A1 | 9/2015 | |

OTHER PUBLICATIONS

Cheah, Chi-Mun, et al., "Automatic Algonillim for Generating Complex Polyhedral Scaffold Structure for Tissue Engineering", Tissue Engineering, 2004, pp. 595-610, vol. 10, No. 3/4, XP002691483.

Gibson, D.W., et al., "Additive Manufacturing Technologies: Rapid Prototyping to Direct Digital Manufacturing", 2010, pp. 126-129, Springer, New York.

Guibas, Leonidas J., et al., "Randomized Incremental Construction of Delaunay and Voronoi Diagams", Algorithmica, Jun. 1992, pp. 381-413, vol. 7, Issue 1-6, Springer-Verlag, New York.

Klassen, Alexander, et al., "Modelling of Electron Beam Absorption in Complex Geometries", *Journal of Physics D: Applied Physics*, Jan. 15, 2014, 12 pages, vol. 47, No. 6, Institute of Physics Publishing Ltd., Great Britain.

Motojima, Seiji, et al., "Chemical Vapor Growth of LaB6 Whiskers and Crystals Having a Sharp Tip", Journal of Crystal Growth, vol. 44, No. 1, Aug. 1, 1978 (Aug. 1, 1978), pp. 106-109.

Weigel, Th., et al., "Design and Preparation of Polymeric Scaffolds for Tissue Engineering," Expert Rev. Med. Devices, 2006, pp. 835-851, vol. 3, No. 6, XP002691485.

Yang, et al., "*The Design of Scaffolds for Use in Tissue Engineering, Part II, Rapid Prototyping Techniques*", Tissue Engineering, 2002, pp. 1-11, vol. 8, No. 1, XP002691484.

Chinese office action for application 201980023122.3 dated Jan. 6, 2022 (12 pages with English Translation).

Japanese office action for application 2020-552399 dated Jan. 31, 2022 (7 pages with English Translation).

Japanese office action for application 2020-552399 dated Sep. 17, 2021 (10 pages with English Translation).

\* cited by examiner

METHOD AND DEVICE FOR DISTRIBUTING POWDER MATERIAL

CROSS REFERENCE TO RELATED APPLICATIONS

This application claims priority to and the benefit of U.S. Provisional Patent Application No. 62/649,750, filed on Mar. 29, 2018; the contents of which as are hereby incorporated by reference in their entirety.

BACKGROUND

Related Field

The invention relates to a powder distributing unit and a method for distributing powder material in an additive manufacturing apparatus.

Description of Related Art

Freeform fabrication or additive manufacturing (AM) using electron beam melting (EBM) or laser beam melting is a method for forming a solid three-dimensional article from a powder. The three-dimensional article is formed layer by layer by successive fusion of selected areas of powder layers, which selected areas correspond to successive layers of the three-dimensional article. A layer of powder, such as metal powder, is deposited on a build area and an electron beam or a laser beam is used to selectively melt the powder layer of the build area. The melted material fuses with under-laying layers and solidifies to form the top layer of the solid three-dimensional article. A further layer of powder is deposited onto the previous layer, and the electron or laser beam is used to selectively melt the further powder layer of the build area. The melted material solidifies and form another solid layer fused onto the previous solid layer. This process is repeated for multiple layers until the desired 3D geometry of the article is achieved.

An apparatus for forming such a three-dimensional article has a build table onto which the three-dimensional article is to be formed, a powder distributor device for delivering powder to the build table (build area) for the formation of the powder layers and an electron beam source or a laser beam source for providing the energy beam used for melting the powder. The build table is arranged in a build tank which in turn is arranged in a build chamber formed by a casing. When using EBM, the build chamber is a vacuum chamber.

A powder layer is created by first distributing a predetermined amount of powder onto the build table by a powder distributor. Thereafter the powder distributor may again be moved over the build table one or several times in order to even out any powder surface irregularities. An even top surface of the powder material, which is to be fused, is important for a finished three-dimensional article with high mechanical strength and an outer dimension resembling with the cad file from which the three-dimensional article is created. However, since a normal three-dimensional article is made up of thousands of individual layers, such repeated powder distribution takes a considerably amount of the total build time which is a problem. Secondly, as the build time is increased it may be necessary to increase the heat input in order to maintain a predetermined temperature interval for the build.

BRIEF SUMMARY

An objective of the invention is to provide a method for powder distribution in an additive manufacturing apparatus which provides for an even top surface irrespective of the powder material and the powder thickness which is to be formed which takes shorter time compared to prior art solutions.

The object is achieved by an additive manufacturing apparatus for additive manufacturing of three dimensional objects by selectively solidifying a powder material layer by layer, wherein the apparatus comprises a powder distribution unit movable across a build area for applying a layer of powder material thereon and a solidification device for selectively solidifying the applied powder layer at positions corresponding to a cross section of the object to be manufactured and a control unit adapted to repeat the steps of applying and selectively solidifying until the object is completed, wherein the powder distribution unit comprises a first and a second powder distributors essentially in parallel with each other and extending in a first direction, the first and second powder distributors are arranged to be adjustably spaced apart in a second direction transversely to the first direction which second direction is essentially in parallel with the direction of movement of the powder distribution unit over the build area.

An exemplary advantage of various embodiments of the present invention is that the distance between at least two powder distributors may be varied depending on different powder application circumstances such as the powder material, the powder layer thickness, the temperature onto which the powder layer are to be applied and/or the powder particle distribution. The freedom to vary the distance between at least to powder distributors depending on the physical requirements of the powder material to be applied at the same time as minimizing its physical dimension at its end positions means that the inventive design will fulfill as smooth powder layer application as possible without enlarging the physical dimension of the additive manufacturing machine as such compared to prior art design.

In another example embodiment of the present invention the first powder distributor is arranged to be movable across the build area independently of the second powder distributor. An exemplary advantage of having multiple powder distributors moving independently of each other will result in more efficient powder application compared to prior art.

In still another example embodiment of the present invention the first powder distributor is adapted to move across the build area with a first speed and the second powder distributor is arranged to move across the build area with a second speed. An exemplary advantage of moving the first and second powder distributors at different speeds may improve the final quality of the top surface of the powder layer. Different amount of powder material pushed in front of a powder distributor may need different speeds in order to create as smooth surface as possible. That means that a speed of a single powder distributor may vary along its stroke of powder application since the amount of powder is constantly decreasing.

In yet another example embodiment of the present invention the first powder distributor is arranged to be moving across the build area at a first distance from the build area and the second powder distributor is arranged to be moving across the build area at a second distance from the build area. An exemplary advantage of arranging a first and second powder distributor at different height compared to each other is that one may steer how much powder material the first and second powder distributor is to pick up and individually apply onto the build area.

In still another example embodiment of the present invention the first powder distributor is having a first shape and the second powder distributor is having a second shape. An exemplary advantage of having different shapes of the different powder distributors is that the leading powder distributor may be the one that provides powder material onto the build area and the trailing powder distributor may be the one that smooths out the top surface already applied by the first powder distributor.

In still another example embodiment the first and second powder distributors are arranged to be spaced apart with a first distance when at rest and a second distance when the first and second powder distributors are moving. An exemplary advantage of this embodiment is that the additive manufacturing apparatus may be manufactured compact although the separation between the powder distributors may be large when moving if the first distance is smaller than the second distance.

In another aspect of the invention it is provided a method for additive manufacturing of three-dimensional objects by selectively solidifying a powder material layer by layer, the method comprising the steps of: applying a layer of powder material within a build area by means of a powder distribution unit moving across the build area, wherein the powder distribution unit comprises a first powder distributor and a second powder distributor essentially in parallel with each other and extending in a first direction, selectively solidifying the applied powder material at positions corresponding to a cross-section of the object to be manufactured, by means of a solidification device, repeating the steps of applying and selectively solidifying until the object is completed, the method further comprising the steps of moving the first and second powder distributors across the build area in a second direction transversely to the first direction, and varying a distance between the first and second powder distributors at least once during the manufacturing of the three-dimensional object.

An exemplary advantage of this embodiment is that a plurality of powder distributors may be arranged at suitable distance between each other depending on the particular additive manufacturing process step.

In another example embodiment the first and second powder distributors are moving independently of each other. An exemplary advantage of at least this embodiment is that each and every powder distributor may be controlled individually at each and every position and stage of additive manufacturing process.

In another example embodiment the first and second powder distributors are spaced apart with a first distance when at rest and a second distance when moving. An exemplary advantage of at least this embodiment is that the powder distributors may be packed closely together when not in use for minimizing it space consumption whereas when in use its individual distance between each other may be enlarged for applying the powder material as efficient and as good as possible.

In still another example embodiment of the present invention the first powder distributor may be moving at a first speed and the second powder distributor may be moving at a second speed. An exemplary advantage of at least this embodiment is that a leading and a trailing powder distributor may have different functionality, i.e., applying powder and smoothening out a top surface of an already applied powder layer, and this may require different speed of the first and second powder distributors in order to reach optimal flatness of the powder layer.

In still another example embodiment of the present invention the first and second powder distributors may be moving at different distance from the build area. An exemplary advantage of at least this embodiment is that the top surface of the powder layer may be smoother if a trailing powder distributor is closer to the build area than the leading powder distributor.

Further advantages and advantageous features of the invention are disclosed in the following description and in the dependent claims.

BRIEF DESCRIPTION OF THE FIGURES

With reference to the appended drawings, below follows a more detailed description of embodiments of the invention cited as examples.

In the drawings.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Still further, to facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "three-dimensional structures" and the like as used herein refer generally to intended or actually fabricated three-dimensional configurations (e.g., of structural material or materials) that are intended to be used for a particular purpose. Such structures, etc. may, for example, be designed with the aid of a three-dimensional CAD system.

The term "electron beam" as used herein in various embodiments refers to any charged particle beam. The sources of charged particle beam can include an electron gun, a linear accelerator and so on.

Figure 1:
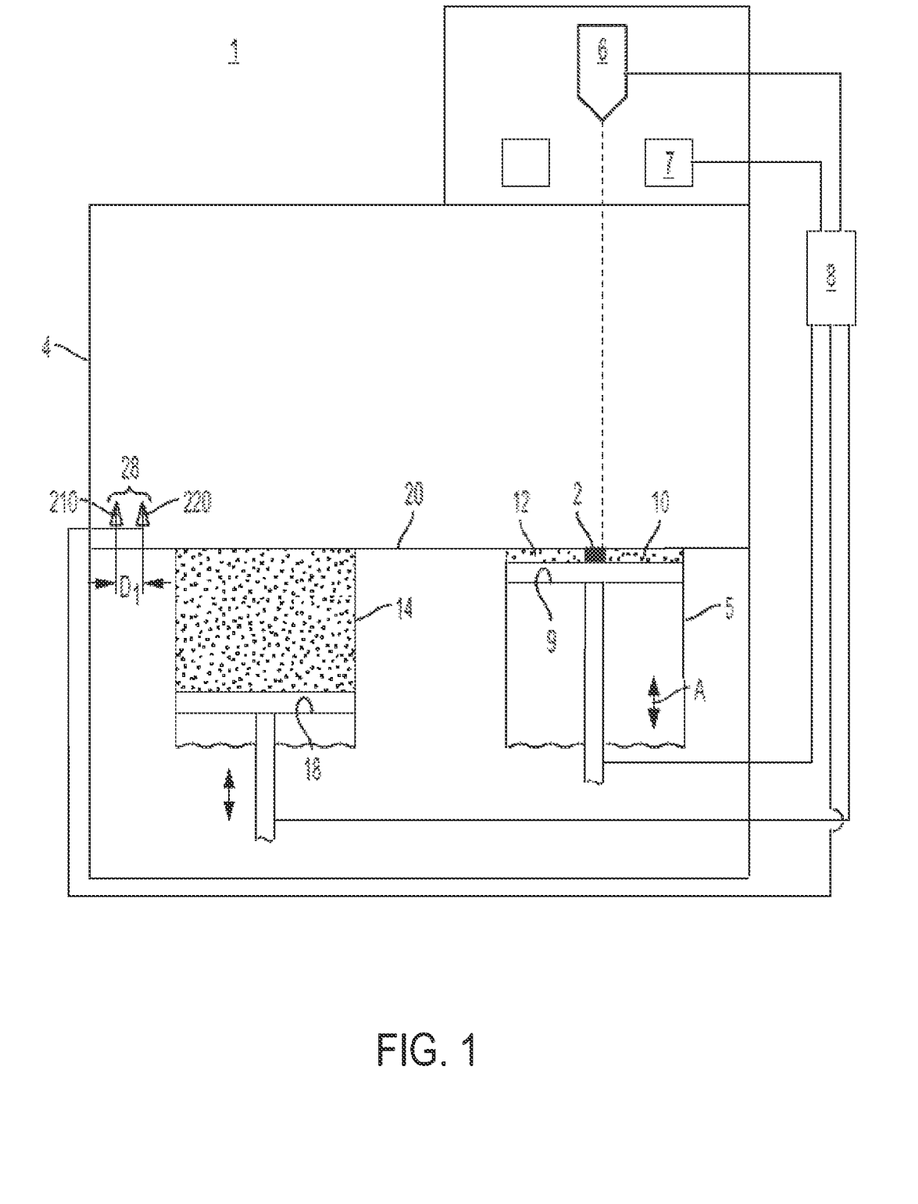
FIG. 1 is a schematic view of an AM apparatus having the inventive powder distribution unit according to the present invention.

FIG. 1 shows an AM apparatus 1 for forming a three-dimensional article 2 layer by layer by successive fusion of selected areas of a powder layers, which selected areas correspond to successive layers of the three-dimensional article. The apparatus 1 comprises a build chamber 4, and a build tank 5 arranged inside the build chamber 4.

Further, the apparatus 1 comprises a powder tank 14, a powder distribution unit 28 and a build table 9 for receiving powder from the powder distribution unit 28. The build table 9 is arranged inside the build tank 5. The build table 9 has a top surface 10 for receiving powder from the powder distribution unit 28. The top surface 10 of the build table 9 is preferably flat and horizontal and is faced upwardly in a vertical direction.

The build table 9 comprises means for movement of the build table 9 relative to the build tank 5 in the vertical direction, such as a servo motor equipped with a gear, adjusting screws, etc. The powder distribution unit 28 is arranged to lay down a thin layer of the powder material on the build table 9 or powder bed 12 in the build tank 5. During a work cycle the build table 9 will be lowered for maintaining the position of the top surface of the powder bed relative to the build tank 5 when adding powder layers to the powder bed 12.

The apparatus 1 has an energy beam source 6 arranged for creating an energy beam. The energy beam is used for melting the selected areas of the powder. The energy beam is scanned over the surface of the current powder layer for melting the selected areas. The selected areas of each layer can be based on a model dividing the article to be manufactured in successive layers or slices. The model may be a computer model generated by a CAD (Computer Aided Design) tool.

In the example embodiment illustrated in FIG. 1, the energy beam source 6 is an electron beam source. The electron beam source can be designed in a way well known to the person skilled in the art. The electron beam source may have an electron gun with an emitter electrode which is connected to a high voltage circuit and a current source for accelerating electrons and releasing electrons from the emitter electrode. These electrons form the electron beam. The electron beam source has also focusing coils and deflection coils 7 for directing the electron beam to various positions of the build layer surface.

The build chamber 4 can be arranged for maintaining a vacuum environment by means of a vacuum system, which may comprise a turbomolecular pump, a scroll pump, an ion pump and one or more valves. Such a vacuum system is known to the person skilled in the art and is not further described or illustrated herein.

In another embodiment of the apparatus, any other suitable energy beam source can be used. For example, a laser beam source. The laser beam source can be designed in a way well known to the person skilled in the art. The laser beam source may have a laser emitter for emitting photons. These photons form the laser beam. The laser beam source has also focusing units and deflection units for directing the laser beam to various positions of the build layer surface. The focusing units can comprise lenses and the deflection units can comprise mirrors.

The build tank 5 may be a cylinder and the build table 9 is arranged inside the cylinder. The cylinder is a body having a cylinder-shaped cavity for receiving the build table 9, preferably a substantially circular cylinder with an inner diameter. Optionally, the outer peripheral surface of the cylinder can also be circular cylinder-shaped. The build table 9 is displaceable relative to the cylinder in an axial direction denoted by arrow A.

Powder material to be distributed as powder layers onto the build table 9 in the build tank 5 is stored in a powder tank 14. The powder distribution unit 28 picks up a predetermined amount of powder from the powder tank and distributes the powder onto the build table 9 in the build tank 5. The predetermined amount of powder picked up by the powder distribution unit 28 is determined by the amount a powder raised above a powder table 20. The predetermined amount of powder is regulated by a level of a powder tank table 18.

A powder layer thickness of a new powder layer in the build tank 5 is determined by how much the build table 9 is lowered down into the build tank 5 relative to the powder table 20.

An area of the build table 9 may be equal to an area of the powder tank table 18.

The powder distribution unit 28 comprises in an example embodiment according to the present invention of a first 210 and a second 220 powder distributor. In other example embodiments the powder distribution unit 28 may comprise 3 or more powder distributors. The first and second powder distributors 210 and 220 respectively are movable independently of each other. In at least one position, which may be the idling position where the powder distribution unit is at rest, the first 210 and second 220 powder distributors are separated by a first distance D1. When the powder distribution unit 28 is distributing powder on top of the build table 9 the first powder distributor 210 and the second powder distributor 220 may be separated by a second distance D2. The second distance D2 may be larger than the first distance D1. The distance between the first 210 and second 220 powder distributors may vary along its path from one side to the other. In a first example embodiment the first and second powder distributors 210, 220 may be separated by the first distance D1 when picking up powder from the powder tank and then distribution at least a portion of the powder onto the build table 9 with a second distance D2 between the first and second powder distributors 210, 220.

In an alternative embodiment, the first end second powder distributors 210, 220 may be separated by a third distance when picking up powder from the powder tank, where the third distance is in between the first distance D1 and the second distance D2. In yet another example embodiment at least one of the powder distributors 210, 220 in the powder distribution unit 28 may be picking up powder material from the powder tank 14 while at least one other powder distributor in the powder distributor unit is at rest, i.e., the second powder distributor 220 may pass the powder tank 14 before the first powder distributor 210 start moving.

In another example embodiment the second powder distributor 220 is passing over the powder tank 14 with the powder tank table at a first position. After the second powder distributor have passed over the powder tank the first powder distributor 210 is passing over the powder tank with the powder tank table at a second position. The second position of the powder tank table 18 is closer to the powder table 20 than the first position of the powder tank table 18 which may result in powder removal from the powder tank by both the first and second powder distributor. This in turn will result in powder material application onto the build table 9 by the first and the second powder distributors.

In still another example embodiment the first and second powder distributors 210, 220 having the second distance D2 in at least one position over the powder tank 14 while picking up powder from it. The powder tank table 18 may be at rest or moving upwards while picking up powder from it.

If the powder tank table is at rest only the second powder distributor 220, i.e., the one passing over the powder tank 14 first, will pick up powder and pushing the powder in front of it. If the powder tank is moving upwards not only the leading powder distributor, 220 in this case, will pick up powder by also the trailing powder distributor, 210 in this case, will pick up powder. In the latter case powder may be distributed over the build table from the first 220 and the second 210 powder distributors.

The distance between the first powder distributor 210 and the second powder distributor 220 may depend on the powder material to be distributed, the powder thickness to be distributed, the powder particle distribution of the powder material to be distributed and/or the average temperature of the top surface onto which the powder layer is to be distributed. For instance, a thicker powder layer may require a larger distance between the first and second powder distributors 210, 220 when applying the powder onto the build table 9 compared to a thinner powder layer. A powder material having a high viscosity may need a larger separation between the first and second powder distributor when applying the powder layer onto the build table compared to a powder material with a lower viscosity. The reason for needing a larger separation for thicker powder layers and higher viscosity is that powder particles tend to interfere with each other. This means that if the powder distributors are too close to each other they tend to disturb one another so that the resulting powder layer smoothness will be destroyed. Increasing the separation between the first and second powder distributors will eliminate the interference/crosstalk situation and the resulting powder layer smoothness will be improved.

A control unit 8 may control the movement of the powder distribution unit 28, the powder tank table 18, the build table 9, the high energy beam 6 and the focus and deflection units 7 for the high energy beam. The control unit 8 may also comprise the scheme for steering the high energy beam in order to manufacture the three-dimensional article according to CAD data.

Figure 2A:
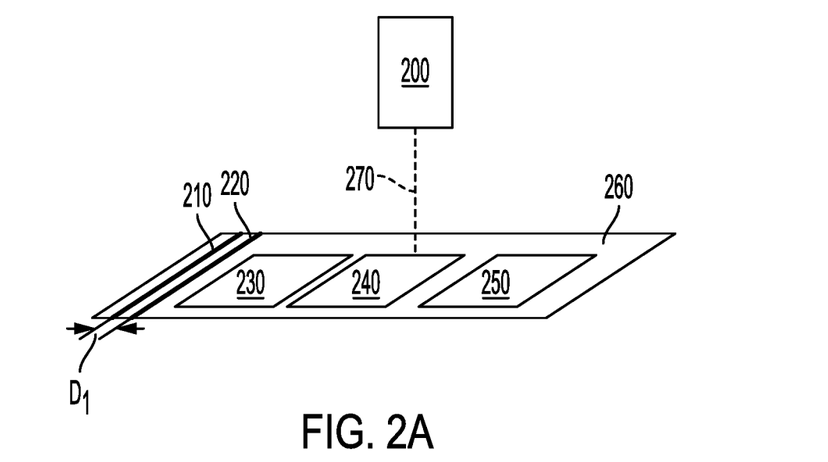
FIG. 2A is a perspective top view showing the build table and the inventive powder distribution unit in a first position.
Figure 2B:
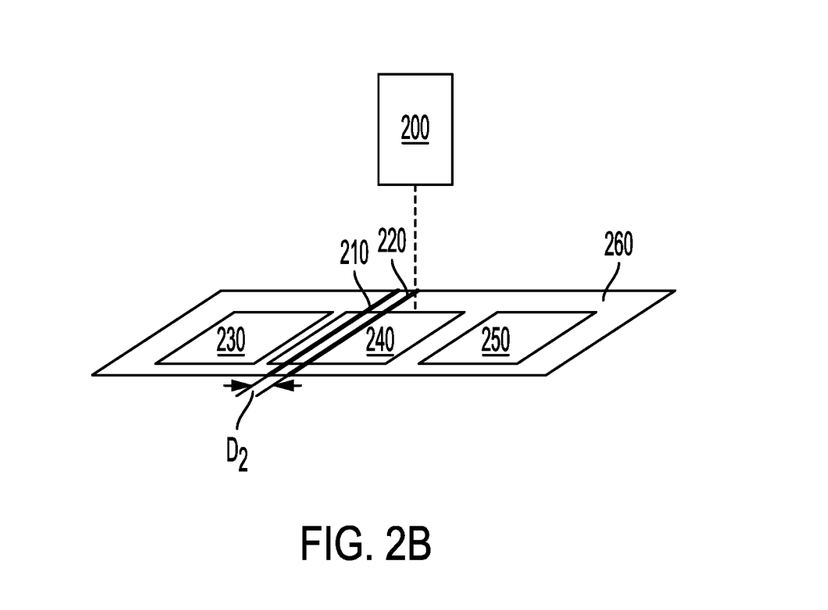
FIG. 2B is a perspective top view showing the build table and the inventive powder distribution unit in a second position.

FIGS. 2A and 2B depict perspective views of another example embodiment of the present invention. In FIG. 2A it is illustrated a first powder distributor 210, a second powder distributor 220, a build tank 240, a first powder tank 230, a second powder tank 250 a high energy beam source 200 and a high energy beam 270. In FIG. 2A the first and second powder distributors 210, 220 are at rest to the left of the first powder tank 230. The distance between the first and second powder distributors when at rest are denoted by distance D1. The energy beam source 200 are heating and/or melting the powder material in the build tank 240 in FIG. 2A.

In FIG. 2B, the first and second powder distributors are applying the powder material picked up from the first powder tank 230 onto a build table in the build tank 240. The separation between the first and second powder distributors while applying the powder layer onto the build table are denoted by D2. D2 is larger than D1. In FIG. 2B the high energy beam source may heat the powder material while providing it onto the build table.

In a first example embodiment the distance D1 is 0-5 mm and the distance D2 is 20-40 mm.

In all example embodiments the first and second powder distributors move independently of each other. This means that the first and second powder distributor may start to move at different time. The first and second powder distributor may move at different speeds. The first powder distributor may move above the powder table at a first distance while the second powder distributor move above the powder table at a second distance. The first and second powder distributors may have equal shape or different shapes.

In another aspect of the invention it is provided a program element configured and arranged when executed on a computer to implement a method as described herein. The program element may be installed in a computer readable storage medium. The computer readable storage medium may be any one of the control units described elsewhere herein or another and separate control unit, as may be desirable. The computer readable storage medium and the program element, which may comprise computer-readable program code portions embodied therein, may further be contained within a non-transitory computer program product. Further details regarding these features and configurations are provided, in turn, below.

As mentioned, various embodiments of the present invention may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (Fe-RAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like, as have been described elsewhere herein. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Figure 3:
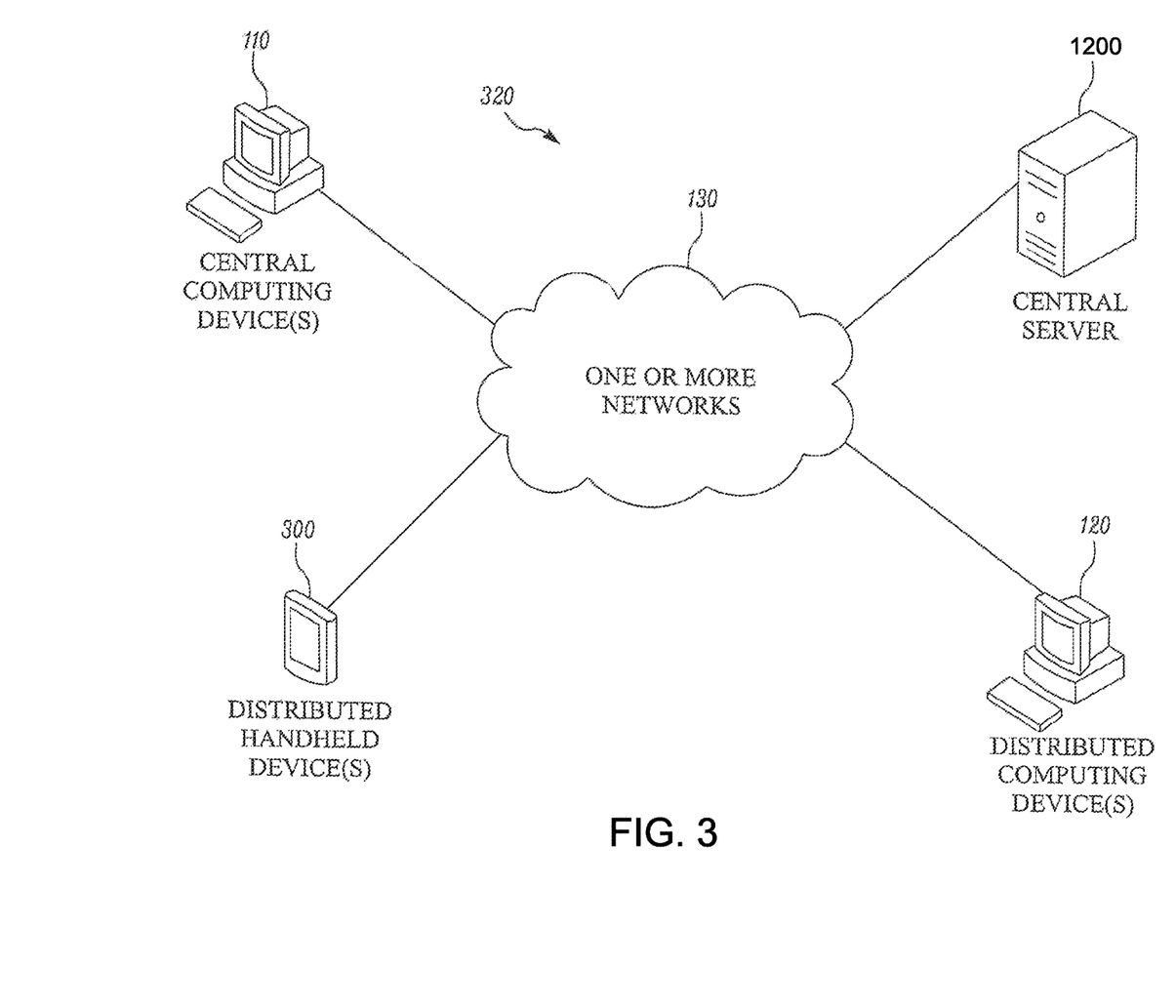
FIG. 3 is a block diagram of an exemplary system according to various embodiments.

FIG. 3 is a block diagram of an exemplary system 320 that can be used in conjunction with various embodiments of the present invention. In at least the illustrated embodiment, the system 320 may include one or more central computing devices 110, one or more distributed computing devices 120, and one or more distributed handheld or mobile devices 300, all configured in communication with a central server 1200 (or control unit) via one or more networks 130. While FIG. 3 illustrates the various system entities as separate, stand-alone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 320 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 110-300 are illustrated in FIG. 3 as communicating with one another over the same network 130, these devices may likewise communicate over multiple, separate networks.

According to one embodiment, in addition to receiving data from the server 1200, the distributed devices 110, 120, and/or 300 may be further configured to collect and transmit data on their own. In various embodiments, the devices 110, 120, and/or 300 may be capable of receiving data via one or more input units or devices, such as a keypad, touchpad, barcode scanner, radio frequency identification (RFID) reader, interface card (e.g., modem, etc.) or receiver. The devices 110, 120, and/or 300 may further be capable of storing data to one or more volatile or non-volatile memory modules, and outputting the data via one or more output units or devices, for example, by displaying data to the user operating the device, or by transmitting data, for example over the one or more networks 130.

In various embodiments, the server 1200 includes various systems for performing one or more functions in accordance with various embodiments of the present invention, including those more particularly shown and described herein. It should be understood, however, that the server 1200 might include a variety of alternative devices for performing one or more like functions, without departing from the spirit and scope of the present invention. For example, at least a portion of the server 1200, in certain embodiments, may be located on the distributed device(s) 110, 120, and/or the handheld or mobile device(s) 300, as may be desirable for particular applications. As will be described in further detail below, in at least one embodiment, the handheld or mobile device(s) 300 may contain one or more mobile applications 330 which may be configured so as to provide a user interface for communication with the server 1200, all as will be likewise described in further detail below.

Figure 4:
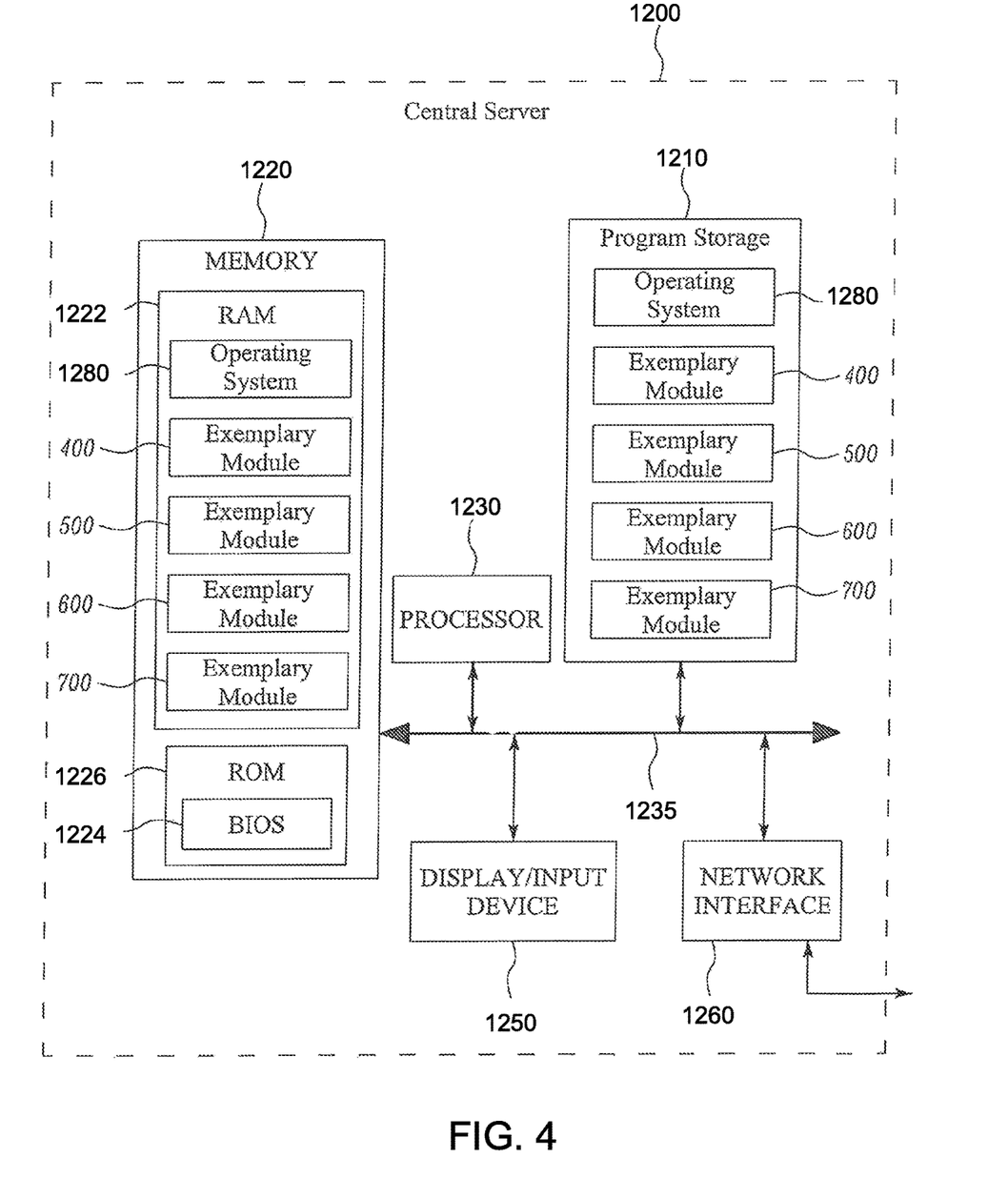
FIG. 4 is a schematic block diagram of an exemplary server according to various embodiments.

FIG. 4 is a schematic diagram of the server 1200 according to various embodiments. The server 1200 includes a processor 1230 that communicates with other elements within the server via a system interface or bus 1235. Also included in the server 1200 is a display/input device 1250 for receiving and displaying data. This display/input device 1250 may be, for example, a keyboard or pointing device that is used in combination with a monitor. The server 1200 further includes memory 1220, which typically includes both read only memory (ROM) 1226 and random access memory (RAM) 1222. The server's ROM 1226 is used to store a basic input/output system 1224 (BIOS), containing the basic routines that help to transfer information between elements within the server 1200. Various ROM and RAM configurations have been previously described herein.

In addition, the server 1200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 1210 are connected to the system bus 1235 by an appropriate interface. The storage devices 1210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 1210 and/or memory of the server 1200 may further provide the functions of a data storage device, which may store historical and/or current delivery data and delivery conditions that may be accessed by the server 1200. In this regard, the storage device 1210 may comprise one or more databases. The term "database" refers to a structured collection of records or data that is stored in a computer system, such as via a relational database, hierarchical database, or network database and as such, should not be construed in a limiting fashion.

A number of program modules (e.g., exemplary modules 400-700) comprising, for example, one or more computer-readable program code portions executable by the processor 1230, may be stored by the various storage devices 1210 and within RAM 1222. Such program modules may also include an operating system 1280. In these and other embodiments, the various modules 400, 500, 600, 700 control certain aspects of the operation of the server 1200 with the assistance of the processor 1230 and operating system 1280. In still other embodiments, it should be understood that one or more additional and/or alternative modules may also be provided, without departing from the scope and nature of the present invention.

In various embodiments, the program modules 400, 500, 600, 700 are executed by the server 1200 and are configured to generate one or more graphical user interfaces, reports, instructions, and/or notifications/alerts, all accessible and/or transmittable to various users of the system 320. In certain embodiments, the user interfaces, reports, instructions, and/or notifications/alerts may be accessible via one or more networks 130, which may include the Internet or other feasible communications network, as previously discussed.

In various embodiments, it should also be understood that one or more of the modules 400, 500, 600, 700 may be alternatively and/or additionally (e.g., in duplicate) stored locally on one or more of the devices 110, 120, and/or 300 and may be executed by one or more processors of the same. According to various embodiments, the modules 400, 500, 600, 700 may send data to, receive data from, and utilize data contained in one or more databases, which may be comprised of one or more separate, linked and/or networked databases.

Also located within the server 1200 is a network interface 1260 for interfacing and communicating with other elements of the one or more networks 130. It will be appreciated by one of ordinary skill in the art that one or more of the server 1200 components may be located geographically remotely from other server components. Furthermore, one or more of the server 1200 components may be combined, and/or additional components performing functions described herein may also be included in the server.

While the foregoing describes a single processor 1230, as one of ordinary skill in the art will recognize, the server 1200 may comprise multiple processors operating in conjunction with one another to perform the functionality described herein. In addition to the memory 1220, the processor 1230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "server" 1200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 1200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Figure 5:
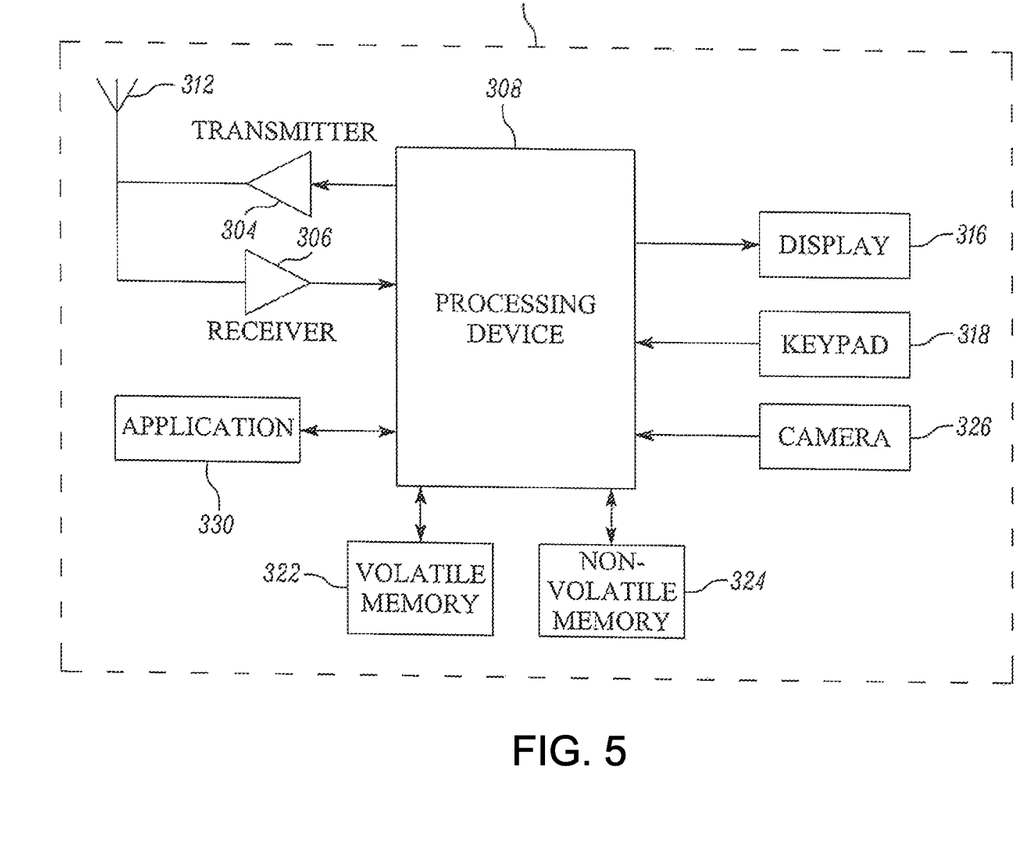
FIG. 5 is a schematic block diagram of an exemplary mobile device according to various embodiments.

FIG. 5 provides an illustrative schematic representative of a mobile device 300 that can be used in conjunction with various embodiments of the present invention. Mobile devices 300 can be operated by various parties. As shown in FIG. 5, a mobile device 300 may include an antenna 312, a transmitter 304 (e.g., radio), a receiver 306 (e.g., radio), and a processing element 308 that provides signals to and receives signals from the transmitter 304 and receiver 306, respectively.

The signals provided to and received from the transmitter 304 and the receiver 306, respectively, may include signaling data in accordance with an air interface standard of applicable wireless systems to communicate with various entities, such as the server 1200, the distributed devices 110, 120, and/or the like. In this regard, the mobile device 300 may be capable of operating with one or more air interface standards, communication protocols, modulation types, and access types. More particularly, the mobile device 300 may operate in accordance with any of a number of wireless communication standards and protocols. In a particular embodiment, the mobile device 300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 300 may include a location determining device and/or functionality. For example, the mobile device 300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 300 may also comprise a user interface (that can include a display 316 coupled to a processing element 308) and/or a user input interface (coupled to a processing element 308). The user input interface can comprise any of a number of devices allowing the mobile device 300 to receive data, such as a keypad 318 (hard or soft), a touch display, voice or motion interfaces, or other input device. In embodiments including a keypad 318, the keypad can include (or cause display of) the conventional numeric (0-9) and related keys (#, *), and other keys used for operating the mobile device 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 300.

The mobile device 300 may also include one or more of a camera 326 and a mobile application 330. The camera 326 may be configured according to various embodiments as an additional and/or alternative data collection feature, whereby one or more items may be read, stored, and/or transmitted by the mobile device 300 via the camera. The mobile application 330 may further provide a feature via which various tasks may be performed with the mobile device 300. Various configurations may be provided, as may be desirable for one or more users of the mobile device 300 and the system 320 as a whole.

The invention is not limited to the above-described embodiments and many modifications are possible within the scope of the following claims. Indeed, a person of ordinary skill in the art would be able to use the information contained in the preceding text to modify various embodiments of the invention in ways that are not literally described, but are nevertheless encompassed by the attached claims, for they accomplish substantially the same functions to reach substantially the same results. Therefore, it is to be understood that the invention is not limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for additive manufacturing of three-dimensional objects by selectively solidifying a powder material layer by layer, said method comprising the steps of:
    applying a layer of powder material onto a build table by means of a powder distribution unit moving across the build table, wherein said powder distribution unit comprises a first powder distributor and a second powder distributor essentially in parallel with each other and extending in a first direction,
    selectively solidifying the applied powder material at positions corresponding to a cross-section of the object to be manufactured, by means of a solidification device,
    lowering the build table,
    repeating the steps of applying and selectively solidifying until the object is completed while also:
        moving said first and second powder distributors across said build table in a second direction transversely to said first direction, and
        varying a distance between said first and second powder distributors at least once during the manufacturing of said three-dimensional object, wherein:
            a linear speed of at least one of the first powder distributor and the second powder distributor is varying when moving said powder distributor across said build table.

2. The method according to claim 1, wherein said first and second powder distributors begin moving at different times.

3. The method according to claim 1, wherein said first and second powder distributors are spaced apart with a first distance when moving and a second distance when at rest.

4. The method according to claim 3, wherein said second distance is smaller than said first distance.

5. The method according to claim 1, wherein said first powder distributor is moving at a first linear speed when moving over said build table and said second powder distributor is moving at a second linear speed when moving over said build table, wherein said first speed is different from said second speed.

6. The method according to claim 5, wherein one of said first and second speed is constant when moving said powder distributor across said build table.

7. The method according to claim 1, wherein:
said first powder distributor is moving across said build table at a first height from said build table; and
said second powder distributor is moving across said build table at a second height from said build table.

8. The method according to claim 1, wherein said first powder distributor is applying new powder material onto said build table.

9. The method according to claim 1, wherein said first and second powder distributors are both applying new powder material onto said build table.

10. The method according to claim 9, wherein:
the first powder distributor is a leading powder distributor moving over a powder tank with a powder tank table at a first position;
the second powder distributor is a trailing powder distributor moving over said powder tank with said powder tank table at a second position; and
said second position is closer to a powder table than said first position.

11. The method according to claim 1, wherein one or more steps are computer-implemented via execution of one or more computer processors to activate at least one control unit.

12. A computer program product comprising at least one non-transitory computer-readable storage medium having computer-readable program code portions embodied therein, the computer-readable program code portions comprising one or more executable portions configured for:
applying a layer of powder material onto a build table by means of a powder distribution unit moving across the build table, wherein said powder distribution unit comprises a first powder distributor and a second powder distributor essentially in parallel with each other and extending in a first direction,
selectively solidifying the applied powder material at positions corresponding to a cross-section of the object to be manufactured, by means of a solidification device,
lowering the build table,
repeating the steps of applying and selectively solidifying until the object is completed while also:
moving said first and second powder distributors across said build table in a second direction transversely to said first direction, and
varying a distance between said first and second powder distributors at least once during the manufacturing of said three-dimensional object, wherein:
a linear speed of at least one of the first powder distributor and the second powder distributor is varying when moving said powder distributor across said build table.

13. The method according to claim 9, further comprising moving a powder tank table upward when both the first powder distributor and the second powder distributor are moving over a powder tank.

* * * * *